(12) United States Patent
Kimura

(10) Patent No.: US 12,608,780 B2
(45) Date of Patent: Apr. 21, 2026

(54) IMAGE PROCESSING APPARATUS AND METHOD, IMAGE CAPTURING APPARATUS AND STORAGE MEDIUM

(71) Applicant: CANON KABUSHIKI KAISHA, Tokyo (JP)

(72) Inventor: Naoto Kimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 18/331,399

(22) Filed: Jun. 8, 2023

(65) Prior Publication Data

US 2023/0410265 A1 Dec. 21, 2023

(30) Foreign Application Priority Data

Jun. 21, 2022 (JP) .................................. 2022-099801

(51) Int. Cl.
*G06V 40/16* (2022.01)
*G06T 5/77* (2024.01)
*G06V 10/42* (2022.01)

(52) U.S. Cl.
CPC ................ *G06T 5/77* (2024.01); *G06V 10/42* (2022.01); *G06V 40/165* (2022.01); *G06T 2207/30201* (2013.01); *G06V 40/178* (2022.01)

(58) Field of Classification Search
CPC ............ G06T 5/77; G06T 2207/30201; G06V 40/165; G06V 10/42; G06V 40/178
See application file for complete search history.

(56) References Cited

U.S. PATENT DOCUMENTS

| | | |
|---|---|---|
| 9,542,734 B2 | 1/2017 | Kimura et al. |
| 10,382,671 B2 | 8/2019 | Imai |
| 2018/0205879 A1 | 7/2018 | Imai |

FOREIGN PATENT DOCUMENTS

| | | | |
|---|---|---|---|
| JP | 2012048344 A | * | 3/2012 |
| JP | 2018-117288 A | | 7/2018 |

* cited by examiner

*Primary Examiner* — Vincent Rudolph
*Assistant Examiner* — Bradley O Felix
(74) *Attorney, Agent, or Firm* — Venable LLP

(57) ABSTRACT

In an image processing apparatus, an extraction unit extracts a plurality of AC signals of a plurality of different frequency bands from image data input by an input unit; a generation unit generates first and second adjustment values for adjusting positive and negative components of an amplitude of each AC signal; an adjustment unit adjusts the amplitude of each AC signal using the first and second adjustment values; a detection unit detects a skin area from the image data; and a correction unit corrects image data of the skin area using the adjusted AC signals. The generation unit generates the first adjustment value such that the positive component of the amplitude of the AC signal of a first frequency band is less attenuated than that of the AC signal of a second frequency band which is lower than the first frequency band.

20 Claims, 11 Drawing Sheets

F I G. 2
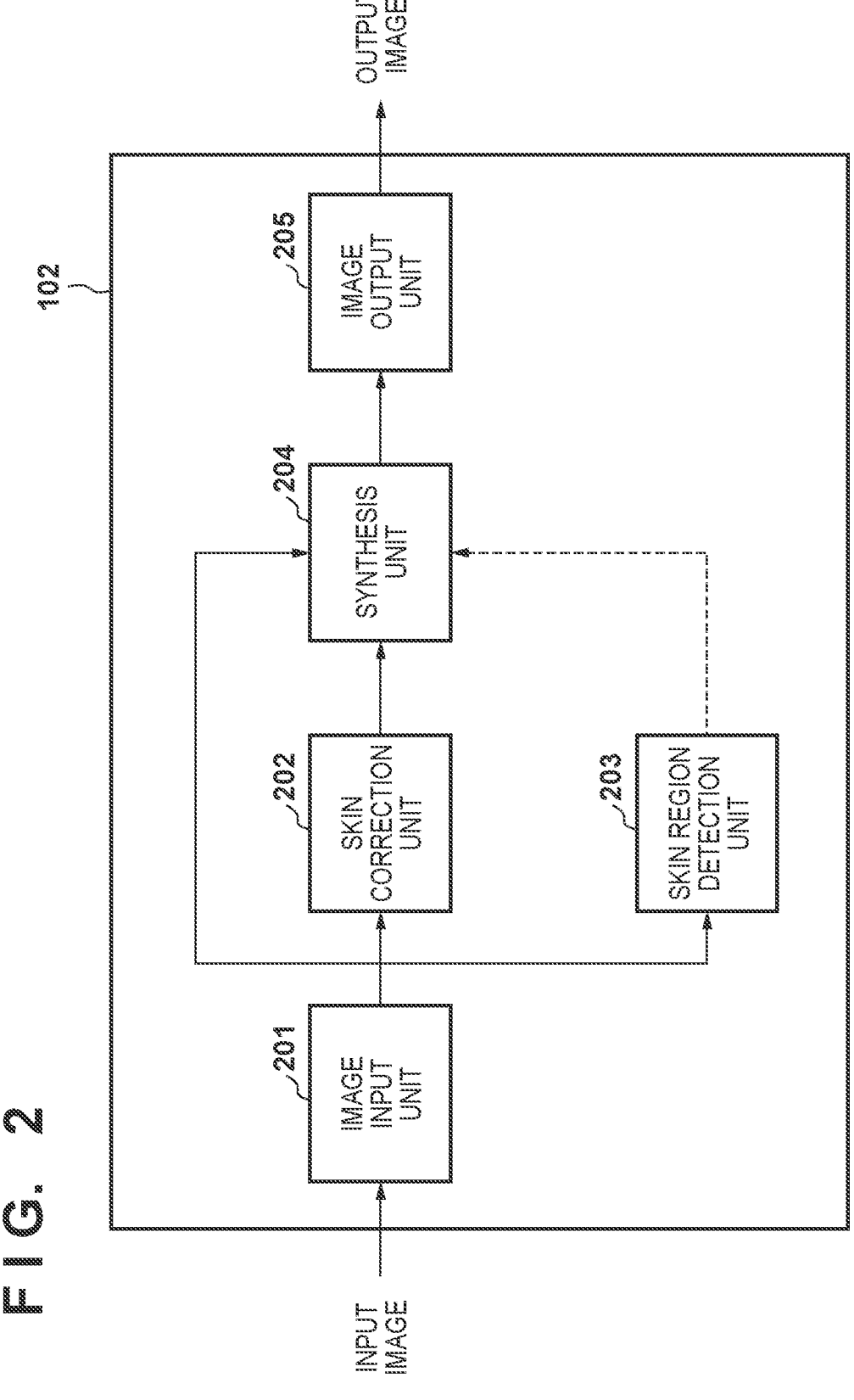

F I G. 3
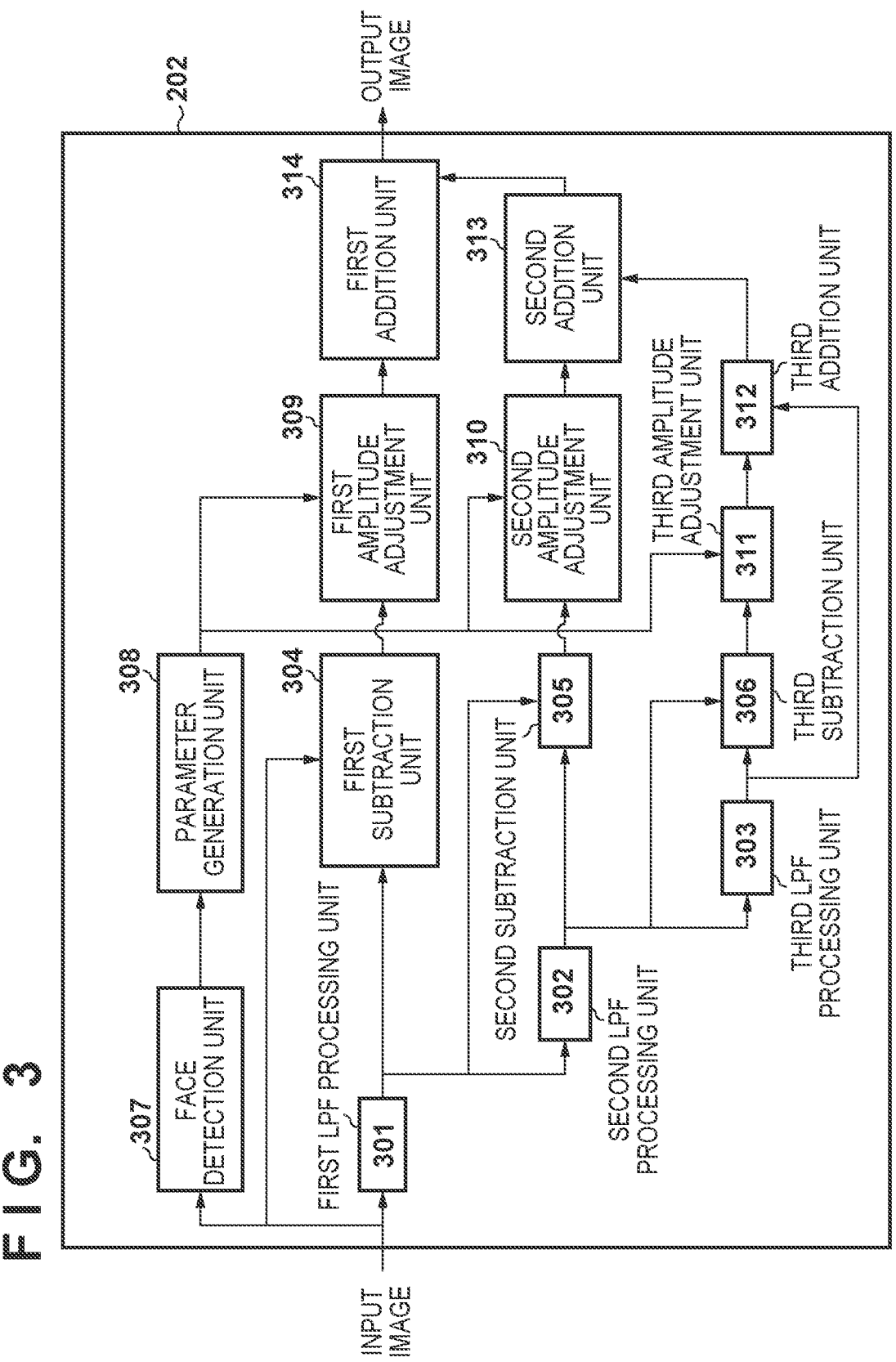

F I G. 5
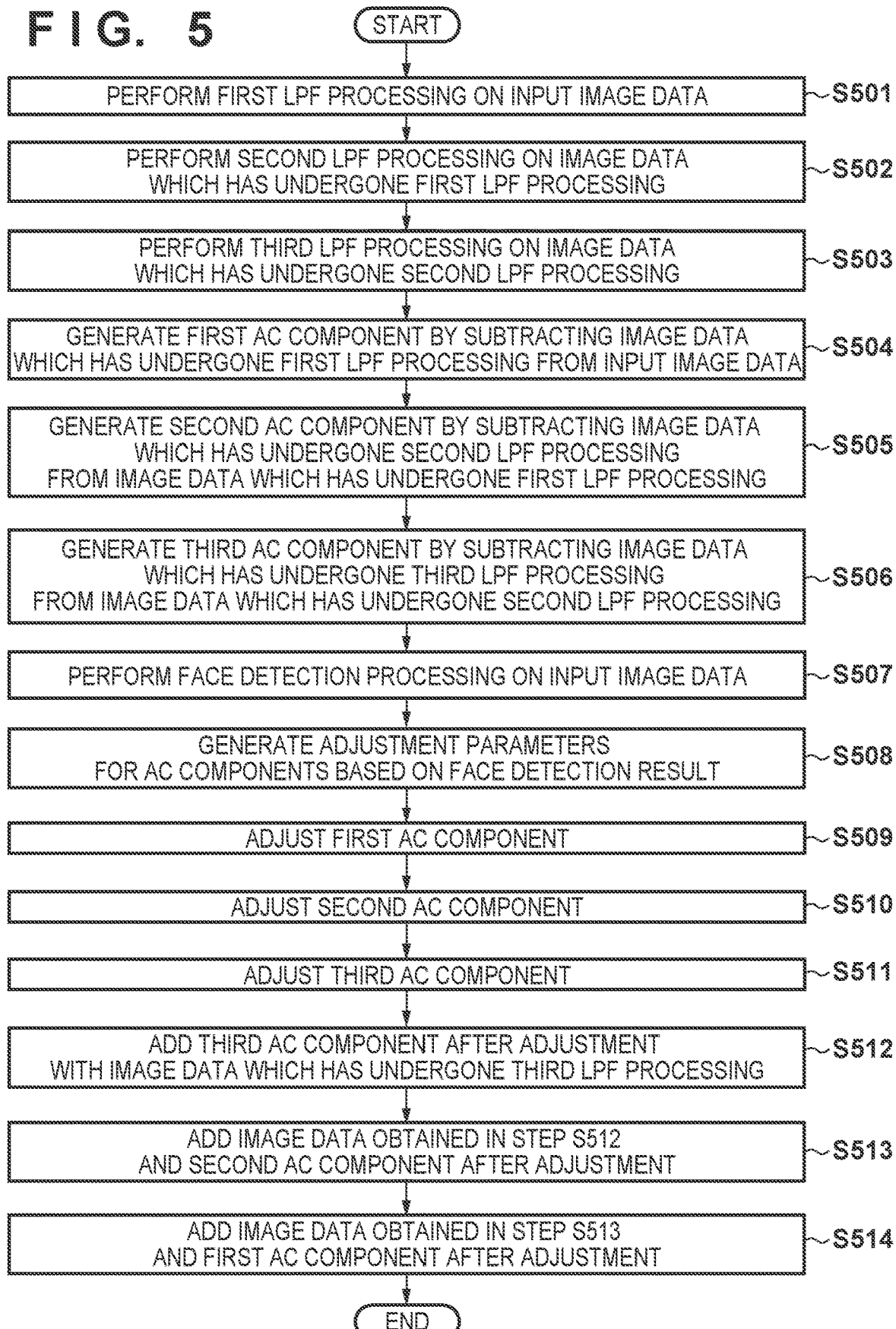

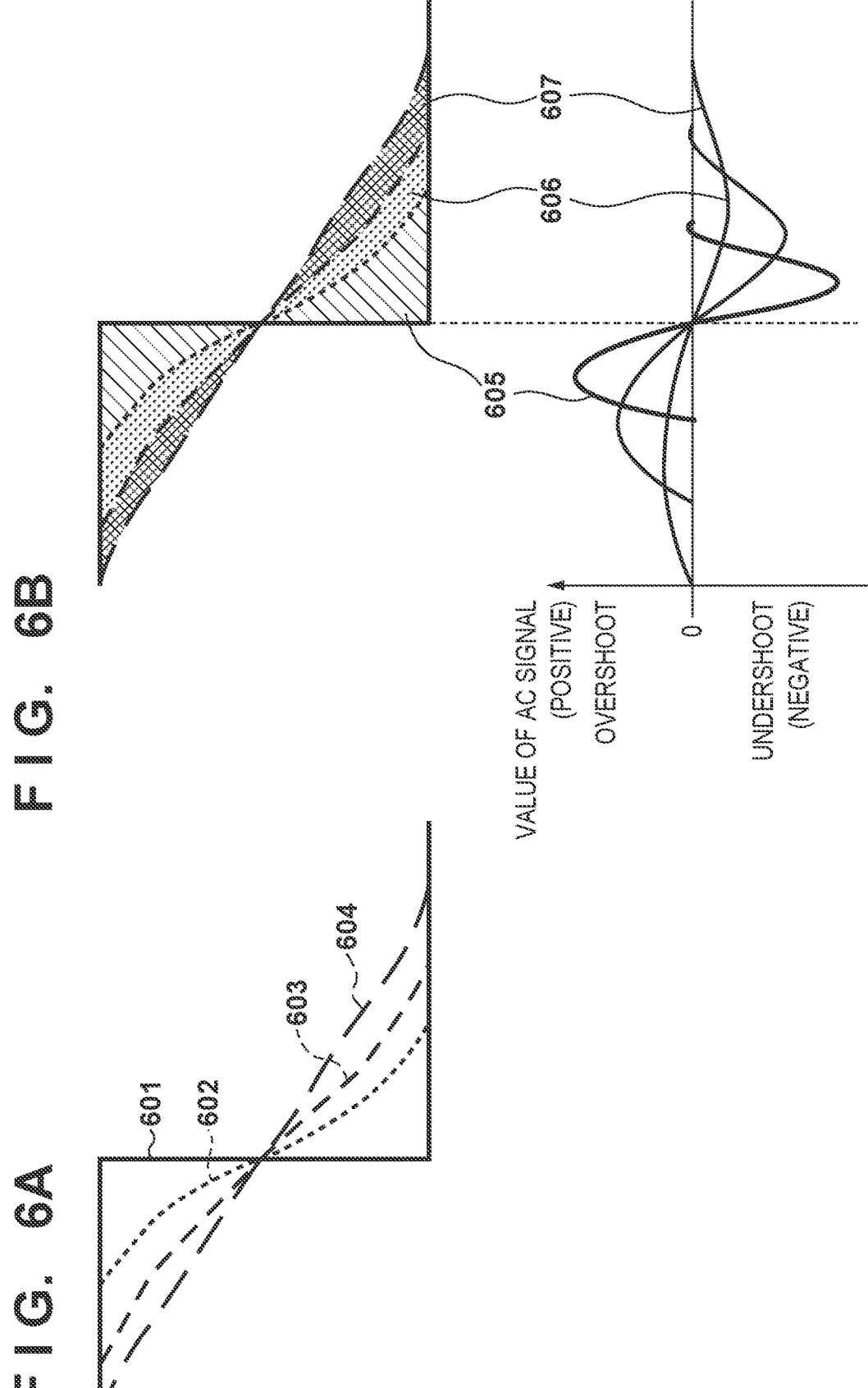

F I G. 7E
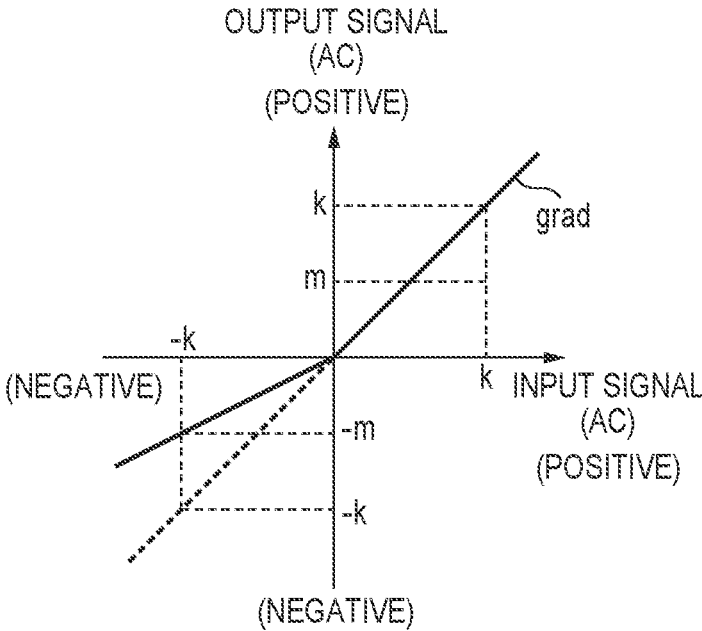
F I G. 7F
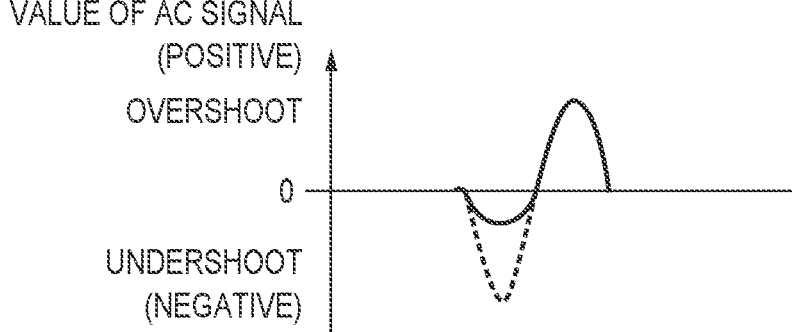

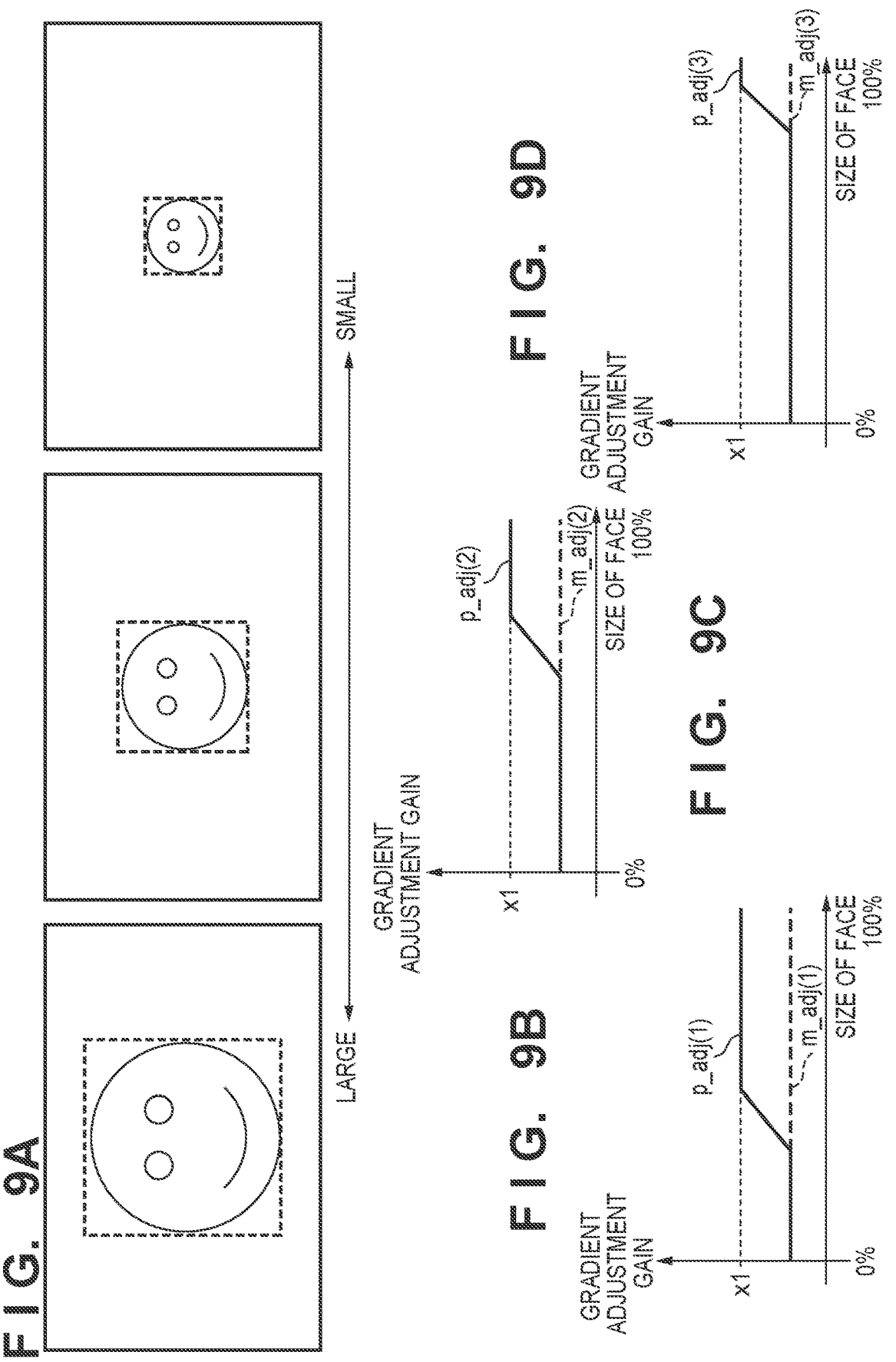

IMAGE PROCESSING APPARATUS AND METHOD, IMAGE CAPTURING APPARATUS AND STORAGE MEDIUM

BACKGROUND OF THE INVENTION

Field of the Invention

The present invention relates to an image processing apparatus and method, an image capturing apparatus, and a storage medium.

Description of the Related Art

Conventionally, there are image capturing apparatuses such as digital cameras that have an imaging function called skin beautification correction that provides an image with beautiful skin by correcting the skin region of a person/persons in the photographed image in a case where an image of a person/persons is shot. Conventional skin beautification correction is realized by performing a simple mean filter process or the like to an image, so there is a problem that the skin looks flat and three dimensional appearance of the face is lost.

To address this problem, Japanese Patent Laid-Open No. 2018-117288 discloses the following technique for obtaining an image with a three-dimensional appearance. First, in consideration of the features of the subject's face, a reference value that serves as a luminance reference is obtained from luminances in the person's face area. Then, using a threshold for luminance set based on the obtained reference value, the person's face area is divided into a plurality of exclusive portions, and the luminances of the plurality of portions are corrected using different correction methods.

However, in the conventional technique disclosed in Japanese Patent Laid-Open No. 2018-117288, since the different correction method is used for each portion of the face, there is a problem in that unnaturalness due to the differences between the correction methods occurs at the boundary portions of the face.

SUMMARY OF THE INVENTION

The present invention has been made in consideration of the above situation, and achieves a natural and appropriate skin beautification correction while maintaining a three dimensional appearance of a person's face in an image obtained by an image capturing apparatus.

According to the present invention, provided is an image processing apparatus comprising one or more processors and/or circuitry which function as: an input unit that inputs image data; an extraction unit that extracts a plurality of AC signals of a plurality of different frequency bands from the image data; a generation unit that generates a first adjustment value and a second adjustment value for adjusting a positive component and a negative component, respectively, of an amplitude of each of the AC signals of the respective frequency bands; an adjustment unit that adjusts the amplitude of each of the plurality of AC signals using the first adjustment value and the second adjustment value; a detection unit that detects a skin area from the image data; and a correction unit that corrects image data of the skin area using the plurality of AC signals which are adjusted by the adjustment unit, wherein the generation unit generates the first adjustment value such that the positive component of the amplitude of the AC signal of a first frequency band among the plurality of frequency bands is less attenuated than the positive component of the amplitude of the AC signal of a second frequency band which is lower than the first frequency band.

Further, according to the present invention, provided is an image capturing apparatus comprising: an image processing apparatus comprising one or more processors and/or circuitry which function as: an input unit that inputs image data; an extraction unit that extracts a plurality of AC signals of a plurality of different frequency bands from the image data; a generation unit that generates a first adjustment value and a second adjustment value for adjusting a positive component and a negative component, respectively, of an amplitude of each of the AC signals of the respective frequency bands; an adjustment unit that adjusts each of the plurality of AC signals using the first adjustment value and the second adjustment value; a detection unit that detects a skin area from the image data; and a correction unit that corrects image data of the skin area using the plurality of AC signals which are adjusted by the adjustment unit, and an imaging unit that performs image shooting and outputs the image data, wherein the generation unit generates the first adjustment value such that the positive component of the amplitude of the AC signal of a first frequency band among the plurality of frequency bands is less attenuated than the positive component of the amplitude of the AC signal of a second frequency band which is lower than the first frequency band.

Furthermore, according to the present invention, provided is an image processing method comprising: inputting image data; extracting a plurality of AC signals of a plurality of different frequency bands from the image data; generating a first adjustment value and a second adjustment value for adjusting a positive component and a negative component, respectively, of an amplitude of each of the AC signals of the respective frequency bands; adjusting the amplitude of each of the plurality of AC signals using the first adjustment value and the second adjustment value; detecting a skin area from the input data; and correcting image data of the skin area using the plurality of AC signals which has been adjusted, wherein the first adjustment value is generated such that the positive component of the amplitude of the AC signal of a first frequency band among the plurality of frequency bands is less attenuated than the positive component of the amplitude of the AC signal of a second frequency band which is lower than the first frequency band.

Further, according to the present invention, provided is a non-transitory computer-readable storage medium, the storage medium storing a program that is executable by the computer, wherein the program includes program code for causing the computer to function as an image processing apparatus comprising: an input unit that inputs image data; an extraction unit that extracts a plurality of AC signals of a plurality of different frequency bands from the image data; a generation unit that generates a first adjustment value and a second adjustment value for adjusting a positive component and a negative component, respectively, of an amplitude of each of the AC signals of the respective frequency bands; an adjustment unit that adjusts the amplitude of each of the plurality of AC signals using the first adjustment value and the second adjustment value; a detection unit that detects a skin area from the image data; and a correction unit that corrects image data of the skin area using the plurality of AC signals which are adjusted by the adjustment unit, wherein the generation unit generates the first adjustment value such that the positive component of the amplitude of the AC signal of a first frequency band among the plurality of frequency bands is less attenuated than the positive component of the amplitude of the AC signal of a second frequency band which is lower than the first frequency band.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a block diagram showing a functional configuration of an image processing unit according to the embodiment;

FIG. 3 is a block diagram showing a functional configuration of a skin correction unit according to the embodiment;

FIG. 5 is a flowchart showing a flow of skin correction processing according to the embodiment;

FIGS. 6A and 6B are conceptual diagrams of AC component extraction processing in the skin correction processing according to the embodiment;

FIGS. 7A to 7F are diagrams for explaining a concept of an AC component adjustment method in the skin correction processing according to the embodiment;

FIGS. 9A to 9D are diagrams showing examples of adjustment gains for the adjustment parameters for the AC components according to the embodiment.

DESCRIPTION OF THE EMBODIMENTS

Figure 1:
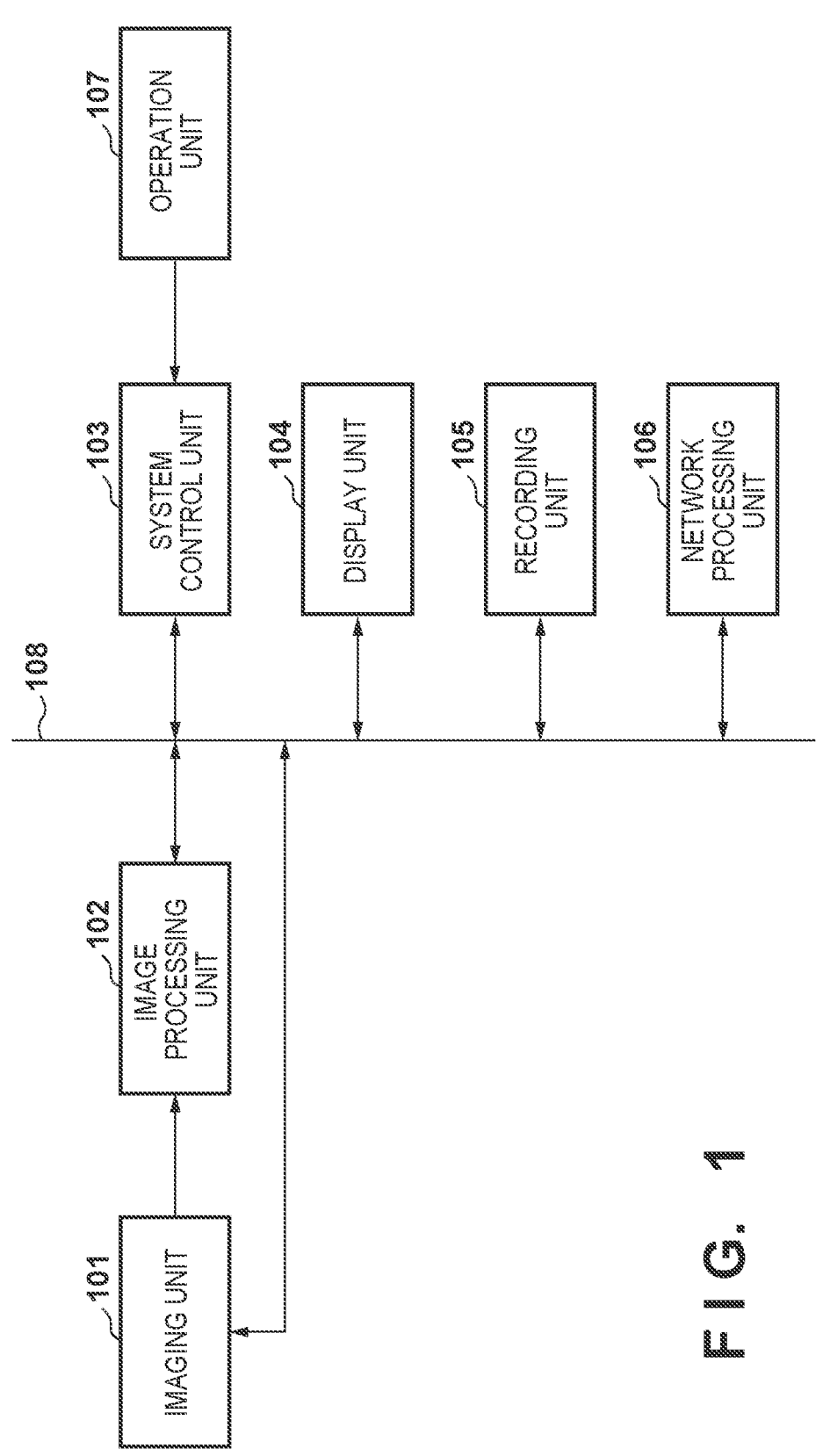
FIG. 1 is a block diagram showing a schematic functional configuration of an image capturing apparatus according to an embodiment of the invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First, an image capturing apparatus to which the image processing of the present invention can be applied will be described. In this embodiment, an image capturing apparatus will be described as an example, however, the present invention is not limited to image capturing apparatuses, and may be applied to image processing apparatuses capable of inputting image data obtained by an image capturing apparatus and performing image processing on the image data.

FIG. 1 is a block diagram showing a schematic functional configuration of an image capturing apparatus according to the embodiment.

An imaging unit 101 includes a lens, an image sensor, an A/D conversion unit, and a development unit, captures an image of a subject based on control signals output from a system control unit 103 in response to instructions from an operation unit 107, and generates image data. An image processing unit 102 performs image processing including skin beautification correction processing on the image data input from the imaging unit 101, a recording unit 105, and a network processing unit 106 based on the control signals output from the system control unit 103. Details of the skin beautification correction processing performed by the image processing unit 102 will be described later in detail.

The system control unit 103 is a control functional unit that controls and integrates the operation of the entire apparatus of the embodiment. Based on instructions sent from the network processing unit 106 and the operation unit 107, the imaging unit 101 is controlled and actuated.

A display unit 104 receives a signal output from the image processing unit 102 and performs processing for displaying an image on a display device such as a liquid crystal display or an organic electro luminescence (EL) display. The recording unit 105 has a function of recording data such as image data, and may include, for example, a memory card equipped with a semiconductor memory, or an information recording medium using a package containing a rotating recording medium such as a magneto-optical disk. Further, the recording unit 105 may be a detachable information recording medium.

The network processing unit 106 acquires image data from an external input device via a network. Furthermore, the network processing unit 106 receives an output signal from the image processing unit 102 and performs processing for transmitting image data to an external display device or an external image processing device such as a PC via a network. A bus 108 is used to exchange image data, control signals, etc. among the imaging unit 101, image processing unit 102, system control unit 103, display unit 104, recording unit 105, and network processing unit 106.

Next, with reference to FIG. 2, a functional configuration for performing the skin beautification correction processing in the image processing unit 102 in this embodiment will be described.

The image processing unit 102 in this embodiment includes an image input unit 201, a skin correction unit 202, a skin region detection unit 203, a synthesis unit 204, and an image output unit 205 as functional components for performing the skin beautification correction processing. The image data input to the image input unit 201 is image data to be subjected to skin beautification correction, and the image data output from the image output unit 205 is an image to which skin beautification correction is applied.

Figure 4:
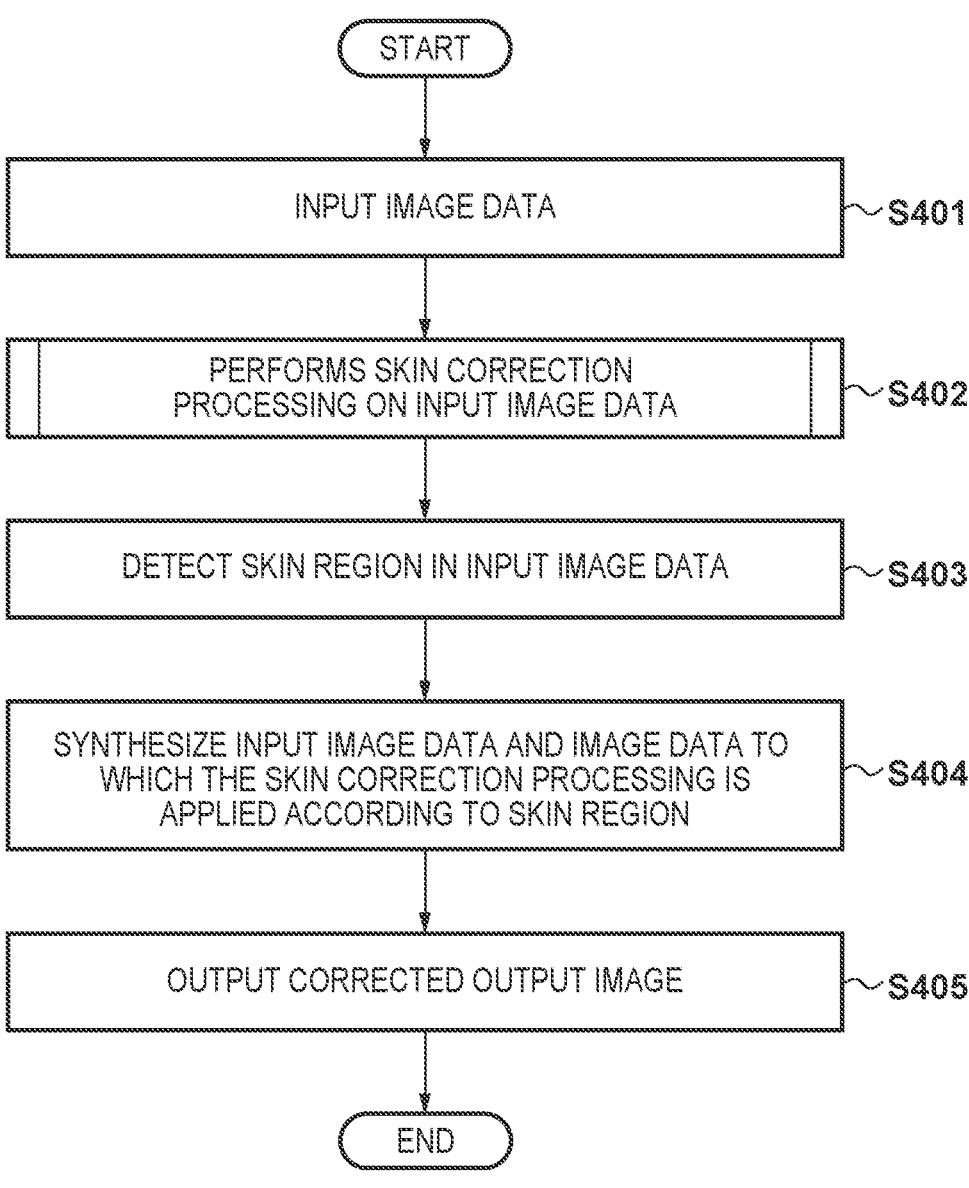
FIG. 4 is a flowchart showing a flow of skin beautification correction processing according to the embodiment.

Next, the skin beautification correction processing by the image processing unit 102 in this embodiment will be described with reference to the flowchart of FIG. 4.

First, in step S401, the image input unit 201 inputs image data to be subjected to skin beautification correction. Then, in step S402, the skin correction unit 202 performs skin correction processing on the image data input in step S401. The skin correction processing performed in step S402 will be described later in detail.

In step S403, the skin region detection unit 203 performs skin region detection process on the image data input in step S401. The method of detecting the skin region is not particularly limited, and a general method of extracting the area corresponding to the skin color based on the hue, saturation, and brightness of the image may be used, or detection processing based on learning data in deep learning, for example, may be performed.

In step S404, the synthesis unit 204 performs weighted synthesis of the image data input in step S401 and the image data to which the skin correction processing is applied in step S402 according to the detection result of the skin region detected in step S403. Here, for pixel coordinates (x, y), let out_pix (x, y) be the signal value of the output image data to which processing by the synthesis unit 204 is applied, let in_pix (x, y) be the signal value of the image data input in step S401, and let cor_pix(x, y) be the signal value of the image data to which the skin correction processing is applied in step S402, then the relationship is expressed by Equation (1). Note that $\alpha$(x, y) indicates the detection result of the skin region detected in step S403, and indicates that the possibility of being a skin region increases as the value approaches 1.0 from 0.0.

$$\text{out\_pix}(x,y)=(1.0-\alpha(x,y))\times\text{in\_pix}(x,y)+\alpha(x,y)\times\text{cor\_pix}(x,y) \quad (1)$$

In this way, the higher the possibility (reliability) of the skin region, the higher the ratio of the signal values to which the skin correction processing is applied. Further, the lower the possibility (reliability) of the skin region, the higher the ratio of the signal values of the input image data to which correction processing is not applied.

In step S405, the image data synthesized in step S404 is output as output image data.

Next, the configuration of the skin correction unit 202 in this embodiment will be described with reference to FIG. 3.

The skin correction unit 202 includes a first low pass filter (LPF) processing unit 301, a second LPF processing unit 302, a third LPF processing unit 303, a first subtraction unit 304, a second subtraction unit 305, a third subtraction unit 306, a face detection unit 307, a parameter generation unit 308, a first amplitude adjustment unit 309, a second amplitude adjustment unit 310, a third amplitude adjustment unit 311, a third addition unit 312, a second addition unit 313, and a first addition unit 314.

The first LPF processing unit 301, the second LPF processing unit 302, and the third LPF processing unit 303 each perform LPF processing using general LPFs such as Gaussian filters and average filters. The cut-off frequencies of the first LPF processing unit 301, the second LPF processing unit 302, and the third LPF processing unit 303 are, from the highest, the first LPF processing unit 301, the second LPF processing unit 302, and the third LPF processing unit 303.

Next, the skin correction processing in step S402 of FIG. 3 performed by the skin correction unit 202 having the above configuration will be described with reference to the flowchart of FIG. 5.

In step S501, the first LPF processing unit 301 performs first LPF processing on the input image data.

In step S502, the second LPF processing unit 302 performs second LPF processing on the image data which has undergone the first LPF processing in step S501.

In step S503, the third LPF processing unit 303 performs third LPF processing on the image data which has undergone the second LPF processing in step S502.

In step S504, the first subtraction unit 304 subtracts image data which has undergone the first LPF processing in step S501 from the input image data to extract a first AC component. Let the input signal be in_pix(x, y) and the image signal which has undergone the first LPF processing be lpf1_pix(x, y) for the coordinates (x, y), the first AC component ac1_pix(x, y) is represented by Equation (2).

$$\text{ac1\_pix}(x,y)=\text{in\_pix}(x,y)-\text{lpf1\_pix}(x,y) \quad (2)$$

Next, in step S505, the second subtraction unit 305 subtracts the image data which has undergone the second LPF processing in step S503 from the image data which has undergone the first LPF processing in step S502 to extract a second AC component. Let lpf1_pix(x, y) be the image signal which has undergone the first LPF processing and lpf2_pix(x, y) be the image signal which has undergone the second LPF processing for the coordinates (x, y), the second AC component ac2_pix(x,y) is represented by Equation (3).

$$\text{ac2\_pix}(x,y)=\text{lpf1\_pix}(x,y)-\text{lpf2\_pix}(x,y) \quad (3)$$

Further, in step S506, a third subtraction unit 306 subtracts the image data which has undergone the third LPF processing in step S504 from the image data which has undergone the second LPF processing in step S503 to extract a third AC component. Let lpf2_pix(x,y) be the image signal which has undergone the second LPF processing and lpf3_pix(x,y) be the image signal which has undergone the third LPF processing for the coordinates (x,y), the third AC component ac3_pix(x,y) is represented by Equation (4).

$$\text{ac3\_pix}(x,y)=\text{lpf2\_pix}(x,y)-\text{lpf3\_pix}(x,y) \quad (4)$$

FIGS. 6A and 6B are conceptual diagrams of the processes from step S501 to step S506.

FIG. 6A is a diagram showing the image signals in one dimension, and showing the processes from step S501 to step S503. An image signal 601 of an input image represented by a rectangular wave gradually becomes smooth as shown by an image signal 602 obtained by performing the first LPF processing, an image signal 603 obtained by performing the second LPF processing, and an image signal 604 obtained by preforming the third LPF processing.

FIG. 6B is a conceptual diagram showing the AC signals obtained by the processing of generating the AC signals from step S504 to step S506, in contrast to the signals shown in FIG. 6A. By the processing in the respective steps, a first AC component 605 in the high frequency band is extracted by the first subtraction unit 304, a second AC component 606 in the middle frequency band is extracted by the second subtraction unit 305, and a third AC component 607 in the low frequency band is extracted by the third subtraction unit 306.

Returning to FIG. 5, in step S507, the face detection unit 307 performs face detection processing on the input image data. Although the method of face detection processing in this embodiment is not particularly limited, here, a known method using learning data in deep learning, for example, is used. Further, in this embodiment, not only coordinate information indicating the position of the face but also coordinate information indicating organs such as eyes and mouth, and identification information such as age and sex are output as the face detection result.

In step S508, the parameter generation unit 308 generates adjustment parameters (adjustment values) for the first to third AC components, which will be used in processes in step S508 to step S510, respectively, based on the face detection result obtained if the face is detected in step S507.

Then, in steps S509 to S511, the first amplitude adjustment unit 309, the second amplitude adjustment unit 310, and the third amplitude adjustment unit 311 adjust the first to third AC components extracted in steps S504 to S506, respectively, using the adjustment parameters generated in step S508. In the present embodiment, non-linear amplitude adjustment is performed using the adjustment parameters, and as a specific adjustment method, a table represented by polygonal lines is used for the amplitude adjustment. The method of generating the adjustment parameters for the first to third AC components and adjustment method performed here will be described later in detail with reference to FIGS. 7A to 7F and FIG. 8.

After finishing the adjustment of the first to third AC components, in step S512, the third addition unit 312 adds the third AC component adjusted in step S511 with the image data which has undergone the third LPF processing in step S503. Let add3_pix(x,y) be the image signal after being added, ac3_o_pix(x,y) be the third AC component after adjustment, and lpf3_pix(x,y) be the image signal which has undergone the third LPF processing for the coordinates (x,y), this process is represented by Equation (5).

$$\text{add3\_pix}(x,y)=ac3\_o\_\text{pix}(x,y)+\text{lpf3\_pix}(x,y) \tag{5}$$

In step S513, the second addition unit 313 adds the second AC component adjusted in step S510 and the image data obtained by performing the addition processing in step S512. Let add2_pix(x, y) be the image signal after being added, ac2_o_pix(x, y) be the second AC component after adjustment, and add3_pix(x,y) be the image signal after the addition processing in step S512 for the coordinates (x,y), this process is represented by Equation (6).

$$\text{add2\_pix}(x,y)=ac2\_o\_\text{pix}(x,y)+\text{add3\_pix}(x,y) \tag{6}$$

In step S514, the first addition unit 314 adds the first AC component adjusted in step S509 and the image data obtained by performing the addition processing in step S513. Let out_pix(x, y) be the image signal after being added, ac1_o_pix(x, y) be the first AC component after adjustment, and add2_pix(x,y) be the image signal after the addition processing in step S513 for the coordinates (x, y), this process is represented by Equation (7).

$$\text{out\_pix}(x,y)=ac1\_o\_\text{pix}(x,y)+\text{add2\_pix}(x,y) \tag{7}$$

The image data to which the process of step S514 is applied as described above is output as corrected output image data, and the processing ends.

Next, a method for adjusting the AC component in this embodiment will be described. First, the concept of the method for adjusting the AC component will be described with reference to FIGS. 7A to 7F.

Figures 7A, 7B, 7C, 7D:
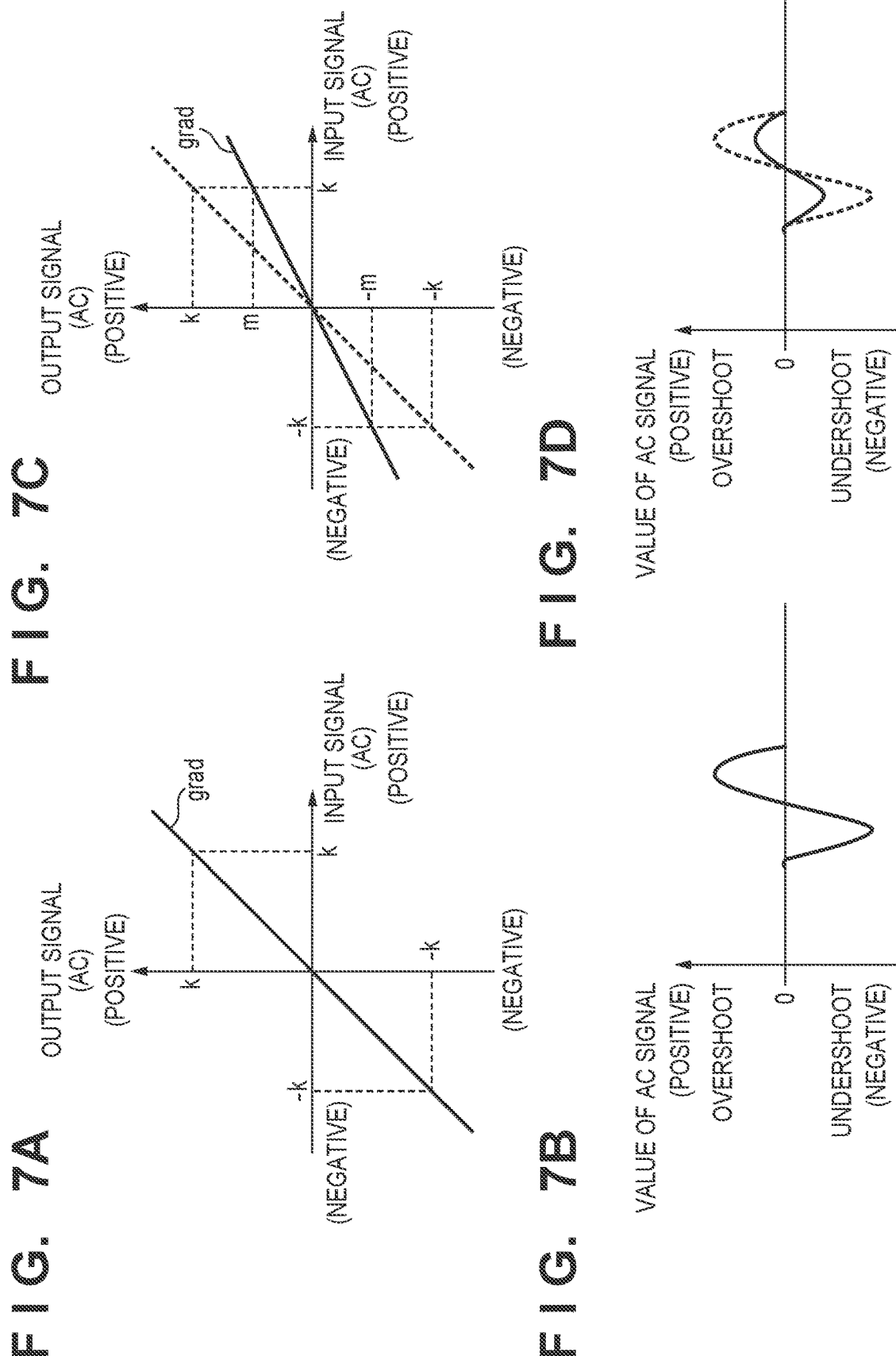

FIG. 7A shows the input/output relationship in a case where the AC component is not adjusted, with the horizontal axis representing an input signal of the AC component and the vertical axis representing an output signal of the AC component. In this case, let ac_out(x, y) be the output signal of the AC component and ac_in(x, y) be the input signal for the coordinates (x, y), the relationship is represented by Equation (8), and as shown in FIG. 7B, the AC signal is output without being adjusted.

$$ac\_out(x,y)=ac\_in(x,y) \tag{8}$$

FIG. 7C shows the input/output relationship in a case of weakening the amplitude of the AC component as shown in FIG. 7D. In this case, let ac_out(x, y) be the output signal of the AC component, ac_in(x, y) be the input signal for the coordinates (x, y), and grad be the adjustment parameter, the relationship is represented by Equation (9).

$$ac\_out(x,y)=\text{grad}\times ac\_in(x,y),(0\leq\text{grad}<1) \tag{9}$$

Also, FIG. 7E shows the input/output relationship in a case where the amplitude of only the AC component on the negative side is weakened as shown in FIG. 7F. In this case, let ac_out(x, y) be the output signal of the AC component, ac_in(x, y) be the input signal for the coordinates (x, y), and grad be the adjustment parameter, the relationship is represented by Equation (10).

$$\text{if } ac\_in(x,y)\geq 0:ac\_out(x,y)=ac\_in(x,y)$$

$$\text{if } ac\_in(x,y)<0:ac\_out(x,y)=\text{grad}\times ac\_in(x,y),$$
$$(0\leq\text{grad}<1) \tag{10}$$

Next, a method of generating the adjustment parameters for the respective AC components performed in step S508 will be described.

Figure 8:
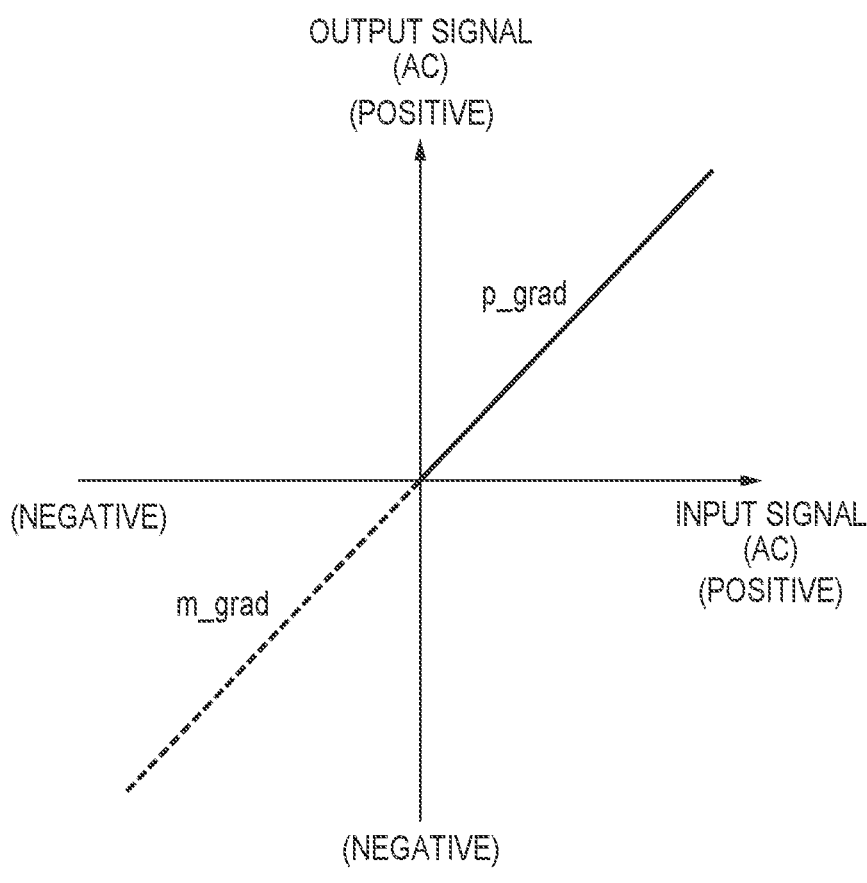
FIG. 8 is a diagram for explaining adjustment parameters for AC components according to the embodiment.

FIG. 8 is a diagram explaining the domain of the input signal (AC component) to which the adjustment parameters are applied in this embodiment. In the present embodiment, the gradient p_grad(n) for adjusting the positive AC component and the gradient m_grad(n) for adjusting the negative AC component are generated for each of the first AC component, the second AC component, and the third AC component, as adjustment parameters. Let ac(n)_out be an output signal of the AC component and ac(n)_in be the input signal of the AC component, the AC component adjustment process can be expressed by Equation (11). Note that (n) takes a value of 1 to 3 here, and represents correspondence to the first AC component, the second AC component, and the third AC component.

$$\text{if } ac(n)\_\text{in}\geq 0:ac(n)\_\text{out}=p\_\text{grad}(n)\times ac(n)\_\text{in}$$

$$\text{if } ac(n)\_\text{in}<0:ac(n)\_\text{out}=m\_\text{grad}(n)\times ac(n)\_\text{in} \tag{11}$$

In the present embodiment, for the AC signal (first AC component) on the high frequency side, an adjustment parameter is generated that attenuates the amplitude of the AC component on the negative side, as shown in FIGS. 7E and 7F. Further, for the AC signal (second AC component and third AC component) on the low frequency side, adjustment parameters that attenuate the amplitude of the AC component on both the positive and negative sides as shown in FIGS. 7C and 7D are generated. Therefore, different values are generated for the first AC component, the second AC component, and the third AC component as the gradients p_grad(n) and m_grad(n) of Equation (11).

The reasons for generating such different adjustment parameters are as follows. First, if the positive side of the AC signal on the high frequency side is attenuated, the three-dimensional appearance of the face as a whole will be deteriorates, but with different adjustment parameters, such deterioration can be prevented. In addition, by attenuating the negative side of the AC signal on the high frequency side, the pores and wrinkles on the human skin become less noticeable, which greatly contributes to the skin looked beautiful. Another reason is that the AC signal on the low frequency side is attenuated on both the positive side and the negative side in order to reduce the unevenness due to spots on the human skin, which contributes to the skin looked beautiful.

For the reason described above, the AC signal on the high frequency side is attenuated only on the negative side, and the AC signals on the low frequency side is attenuated on both the positive and negative sides. However, in a case where the size of the face changes depending on the scene, the target frequency to be attenuated also changes. Therefore, the adjustment parameters may be generated further according to the size of the face. Let def_grad be a predetermined gradient value, and p_adj(n) and m_adj(n) be the positive side and the negative side of the gradient adjustment gain, respectively, determined by the size of the face, then gradient p_grad(n) for adjusting the AC component on the positive side and gradient m_grad(n) for adjusting the AC component on the negative side are represented by Equation (12).

$$p\_\text{grad}(n)=p\_\text{adj}(n)\times\text{def\_grad}$$

$$m\_\text{grad}(n)=m\_\text{adj}(n)\times\text{def\_grad} \tag{12}$$

Although def_grad is 1.0 in this embodiment, it may a fixed value that attenuates the gradients p_grad(n) and m_grad(n).

The gradient adjustment gains p_adj(n) and m_adj(n) are realized by preparing a table for determining values according to the size of the face for each AC component, as shown in FIGS. 9B to 9D. The vertical axis of the table indicates value of the gradient adjustment gain, and the horizontal axis indicates the size of the face. In the examples of FIGS. 9B and 9D, the ratio of the face region to the entire image is shown as the size of the face, but the number of pixels in the face region may be used as it is.

As shown in FIG. 9B, if the size of the face is equal to or less than a predetermined size, even the first AC component corresponding to the high frequency side corresponds to the frequency of unevenness due to spots, for example, so the values of the gradient adjustment gains are such that they attenuate the AC component both on the positive and negative sides. On the other hand, as the size of the face increases, the frequency will affect the three-dimensional appearance of the face and pores, so a table shows that the positive side of the AC component is not attenuated, and only the negative side of the AC component is attenuated. Further, regarding the table of the second AC component shown in FIG. 9C and the table of the third AC component shown in FIG. 9D, since the change in frequency that influences the three-dimensional appearance of the face and pores reduces, the range of the gradient adjustment gains that attenuate the AC component is widened on both the positive and negative sides. By determining the gradient adjustment gain in this way, even if the size of the face changes, it is possible to adaptively change the frequency to perform skin beautification correction.

Also, as another factor, in addition to the adjustment gains according to the size of the face, a gradient adjustment gain according to age may be added as in Equation (13). The difference from Equation (12) is that the gradient adjustment gain age_adj according to age is further applied as a coefficient.

$$p\_grad(n)=p\_adj(n)\times age\_adj\times def\_grad$$

$$m\_grad(n)=m\_adj(n)\times age\_adj\times def\_grad \quad (13)$$

Figure 10A:
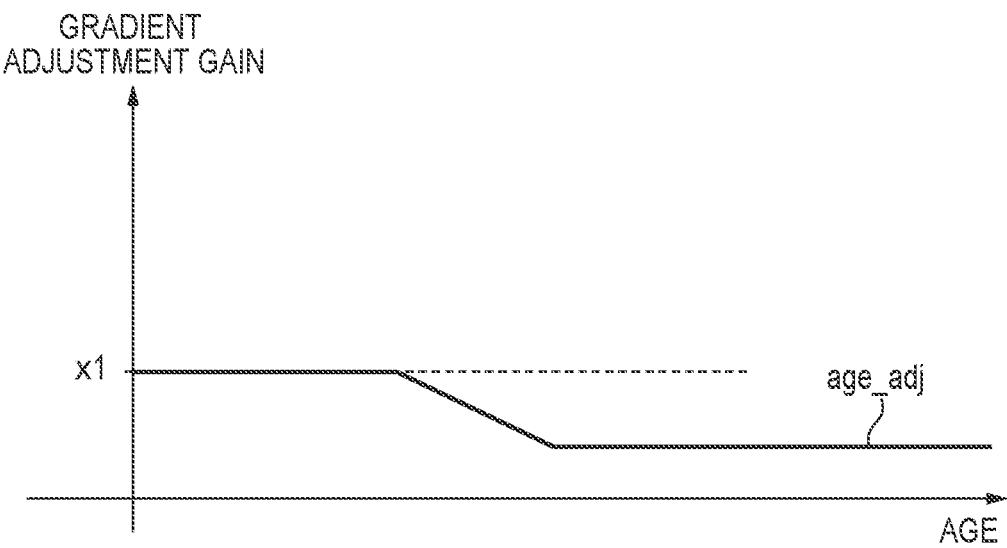
FIGS. 10A and 10B are diagrams showing another example of adjustment gains for the adjustment parameters for the AC components according to the embodiment.

As for the gradient adjustment gain age_adj according to age, it is preferable to generate a gradient adjustment gain that attenuates the AC component more as the age increases, as in the table shown in FIG. 10A. This is because, with aging, wrinkles and uneven spots increase, so a stronger skin beautification effect may be desired.

Figure 10B:
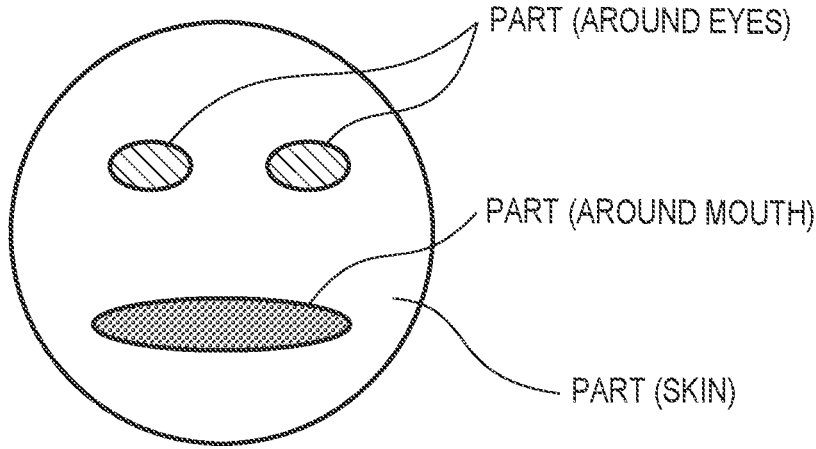

Further, as shown in FIG. 10B, the gradient adjustment gain may be set respectively for the part of the face. Specifically, if it is desired to weaken the skin-beautification effect for the skin area around the eyes in order to make eyelashes, makeup, etc. sharper, the gradient adjustment gain may be increased, and if it is desired to strengthen the skin-beautification effect for the skin area around the mouth in order to make the remainder of beard inconspicuous, the gradient adjustment gain may be decreased. Let part_adj(x, y) be the adjustment gain corresponding to the part, the gradient adjustment gain is expressed as in Equation (14). In this case, since the gain is changed according to the part of the face, the gain depends on the coordinates (x, y).

$$p\_grad(n)(x,y)=p\_adj(n)\times part\_adj(x,y)\times def\_grad$$

$$m\_grad(n)(x,y)=m\_adj(n)\times part\_adj(x,y)\times def\_grad \quad (14)$$

Furthermore, different adjustment gains may be applied according to gender.

As described above, according to the present embodiment, the AC component extracted from the image for each frequency is adjusted for each frequency according to the characteristics of the skin and face of the person, thereby the three-dimensional appearance of the human face is maintained and natural and appropriate skin beautification correction can be achieved.

Other Embodiments

The present invention may be applied to a system composed of a plurality of devices or to an apparatus composed of a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-099801, filed Jun. 21, 2022 which is hereby incorporated by reference herein in its entirety.

What is claimed is:

1. An image processing apparatus comprising:
one or more processors and/or circuitry which function as:
(1) an input unit that inputs image data;
(2) an extraction unit that extracts a plurality of AC signals of a plurality of different frequency bands from the image data;
(3) a generation unit that generates a first adjustment value for adjusting a positive component and a second adjustment value for attenuating a negative component of an amplitude of each of the AC signals of the respective frequency bands;

(4) an adjustment unit that adjusts the amplitude of each of the plurality of AC signals using the first adjustment value and the second adjustment value;

(5) a detection unit that detects a skin area from the image data;

(6) a correction unit that corrects image data of the skin area using the plurality of AC signals which are adjusted by the adjustment unit; and (7) an output unit that outputs the corrected image data of the skin area, wherein the generation unit generates the first adjustment value such that the positive component of the amplitude of the AC signal of a first frequency band among the plurality of frequency bands is less attenuated than the positive component of the amplitude of the AC signal of a second frequency band which is lower than the first frequency band.

2. The image processing apparatus according to claim 1, wherein the detection unit further detects reliability of the skin area, and wherein the correction unit corrects the image data of the skin area by replacing AC signals of the skin area by AC signals respectively obtained by weighted-adding an AC signal obtained by adding the plurality of AC signals adjusted by the adjustment unit and the AC signals of the skin area according to the reliability.

3. The image processing apparatus according to claim 1, wherein the generation unit generates the first adjustment value and the second adjustment value such that:

(1) the first adjustment value for the first frequency band does not attenuate the positive component of the amplitude of the AC signal, and the second adjustment value for the first frequency band attenuates the negative component of the AC signal, and (2) the first adjustment value and the second adjustment value for the second frequency band attenuates the positive component and the negative component of the AC signal.

4. The image processing apparatus according to claim 1, wherein the one or more processors and/or circuitry further function as a face detection unit that detects a face area from the image data, and wherein the generation unit generates the first adjustment value and the second adjustment value based on information of the face area.

5. The image processing apparatus according to claim 4, wherein the generation unit generates the first adjustment value and the second adjustment value based on a size of the face area.

6. The image processing apparatus according to claim 5, wherein the generation unit:

(1) generates the first adjustment value that does not attenuate the positive component of the amplitude of the AC signal of the first frequency band and the second adjustment value that attenuates the positive component of the amplitude of the AC signal of the first frequency band in a case where the size of the face area is larger than a predetermined first size, and generates the first adjustment value and the second adjustment value that attenuate the positive component and the negative component of the amplitude of the AD signal of the first frequency band in a case where the size of the face area is equal to or less than the first size, and (2) generates the first adjustment value that does not attenuate the positive component of the amplitude of the AC signal of the second frequency band and the second adjustment value that attenuates the positive component of the amplitude of the AC signal of the second frequency band in a case where the size of the face area is larger than a predetermined second size, and generates the first adjustment value and the second adjustment value that attenuate the positive component and the negative component of the amplitude of the AD signal of the second frequency band in a case where the size of the face area is equal to or less than the second size, and wherein the first size is smaller than the second size.

7. The image processing apparatus according to claim 4, wherein the information of the face area includes an age of a person, and wherein the generation unit generates the first adjustment value and the second adjustment value further based on the age.

8. The image processing apparatus according to claim 7, wherein the generation unit adjusts the first adjustment value and the second adjustment value such that the amplitudes of the AC signals attenuate more if the age is higher than a first age than if the age is a second age which is lower than the first age.

9. The image processing apparatus according to claim 4, wherein the information of the face area includes gender of a person, and wherein the generation unit generates the first adjustment value and the second adjustment value further based on the gender.

10. The image processing apparatus according to claim 4, wherein the information of the face area includes a part of the face, and wherein the generation unit generates the first adjustment value and the second adjustment value further based on the part.

11. The image processing apparatus according to claim 10, wherein, in a case where the part is eyes, the generation unit adjust the first adjustment value such that the amplitude of the AC signal of the first frequency band in an area around the eyes is less attenuated among the image data.

12. The image processing apparatus according to claim 10, wherein, in a case where the part is a mouth, the generation unit adjusts the first adjustment value such that the amplitude of the AC signal of the first frequency band in an area around the mouth is less attenuated among the image data.

13. The image processing apparatus according to claim 1, wherein the generation unit generates the first adjustment value such that the positive component of the amplitude of the AC signal of the first frequency band is less attenuated than the negative component of the amplitude of the AC signal of the first frequency band.

14. The image processing apparatus according to claim 13, wherein the generation unit generates the first adjustment value for the first frequency band such that the first adjustment value for the first frequency band does not attenuate the positive component of the amplitude of the AC signal of the first frequency band.

15. An image capturing apparatus comprising:

an image processing apparatus comprising one or more processors and/or circuitry which function as: (1) an input unit that inputs image data; (2) an extraction unit that extracts a plurality of AC signals of a plurality of different frequency bands from the image data; (3) a generation unit that generates a first adjustment value for adjusting a positive component and a second adjustment value for attenuating a negative component of an amplitude of each of the AC signals of the respective frequency bands; (4) an adjustment unit that adjusts each of the plurality of AC signals using the first adjustment value and the second adjustment value; (5) a detection unit that detects a skin area from the image data; (6) a correction unit that corrects image data of the skin area using the plurality of AC signals which are adjusted by the adjustment unit; and (7) an output unit that outputs the corrected image data of the skin area; and an imaging unit that performs image shooting and outputs the image data, wherein the generation unit generates the first adjustment value such that the positive component of the amplitude of the AC signal of a first frequency band among the plurality of frequency bands is less attenuated than the positive component of the amplitude of the AC signal of a second frequency band which is lower than the first frequency band.

16. The image capturing apparatus according to claim 15, wherein the generation unit generates the first adjustment value such that the positive component of the amplitude of the AC signal of the first frequency band is less attenuated than the negative component of the amplitude of the AC signal of the first frequency band.

17. An image processing method comprising:

inputting image data;

extracting a plurality of AC signals of a plurality of different frequency bands from the image data;

generating a first adjustment value for adjusting a positive component and a second adjustment value for attenuating a negative component of an amplitude of each of the AC signals of the respective frequency bands;

adjusting the amplitude of each of the plurality of AC signals using the first adjustment value and the second adjustment value;

detecting a skin area from the input data;

correcting image data of the skin area using the plurality of AC signals which has been adjusted; and outputting the corrected image data of the skin area, wherein the first adjustment value is generated such that the positive component of the amplitude of the AC signal of a first frequency band among the plurality of frequency bands is less attenuated than the positive component of the amplitude of the AC signal of a second frequency band which is lower than the first frequency band.

18. The method according to claim 17, where the first adjustment value is generated such that the positive component of the amplitude of the AC signal of the first frequency band is less attenuated than the negative component of the amplitude of the AC signal of the first frequency band.

19. A non-transitory computer-readable storage medium, the storage medium storing a program that is executable by the computer, wherein the program includes program code for causing the computer to function as an image processing apparatus comprising:

an input unit that inputs image data;

an extraction unit that extracts a plurality of AC signals of a plurality of different frequency bands from the image data;

a generation unit that generates a first adjustment value for adjusting a positive component and a second adjustment value for attenuating a negative component of an amplitude of each of the AC signals of the respective frequency bands;

an adjustment unit that adjusts the amplitude of each of the plurality of AC signals using the first adjustment value and the second adjustment value;

a detection unit that detects a skin area from the image data;

a correction unit that corrects image data of the skin area using the plurality of AC signals which are adjusted by the adjustment unit; and an output unit that outputs the corrected image data of the skin area, wherein the generation unit generates the first adjustment value such that the positive component of the amplitude of the AC signal of a first frequency band among the plurality of frequency bands is less attenuated than the positive component of the amplitude of the AC signal of a second frequency band which is lower than the first frequency band.

20. The storage medium according to claim 19, wherein the generation unit generates the first adjustment value such that the positive component of the amplitude of the AC signal of the first frequency band is less attenuated than the negative component of the amplitude of the AC signal of the first frequency band.

* * * * *